(12) United States Patent
Afshar

(10) Patent No.: US 11,979,365 B1
(45) Date of Patent: May 7, 2024

(54) SYSTEMS AND METHODS FOR AUTOMATED GENERATION OF CUSTOMIZED CONTENT

(71) Applicant: Meta Platforms, Inc., Menlo Park, CA (US)

(72) Inventor: Jaleh Afshar, Menlo Park, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 88 days.

(21) Appl. No.: 17/347,401

(22) Filed: Jun. 14, 2021

(51) Int. Cl.
| | |
|---|---|
| *G06F 15/16* | (2006.01) |
| *G06F 3/04847* | (2022.01) |
| *G06N 5/04* | (2023.01) |
| *G06N 20/00* | (2019.01) |
| *H04L 51/212* | (2022.01) |
| *H04L 51/52* | (2022.01) |
| *G06F 40/30* | (2020.01) |

(52) U.S. Cl.
CPC .......... *H04L 51/52* (2022.05); *G06F 3/04847* (2013.01); *G06N 5/04* (2013.01); *G06N 20/00* (2019.01); *H04L 51/212* (2022.05); *G06F 40/30* (2020.01)

(58) Field of Classification Search
CPC ....... H04L 51/52; H04L 51/212; G06N 20/00; G06N 5/04; G06F 3/04847; G06F 40/30
USPC .......................................................... 709/206
See application file for complete search history.

(56) References Cited

U.S. PATENT DOCUMENTS

| | | | |
|---|---|---|---|
| 2017/0142221 A1* | 5/2017 | Bhogal | G06N 7/01 |
| 2019/0147017 A1* | 5/2019 | Tran | G06F 3/0485 |
| | | | 715/720 |
| 2022/0222289 A1* | 7/2022 | Srinivasan | G06F 16/24578 |
| 2022/0374139 A1* | 11/2022 | Wehrman | G11B 27/34 |
| 2023/0021182 A1* | 1/2023 | Loi | H04L 51/043 |

* cited by examiner

*Primary Examiner* — Alan S Chou
(74) *Attorney, Agent, or Firm* — Jordan IP Law, LLC

(57) ABSTRACT

Systems, methods, and non-transitory computer-readable media can be configured to determine a life story associated with a first user of a content sharing system. The life story can comprise a plurality of content items associated with the first user. The plurality of content items can be organized in chronological order. A determination is made that a second user has accessed the life story associated with the first user. The plurality of content items included in the life story are provided for presentation in a graphical user interface, wherein each content item is presented individually based on the chronological order.

20 Claims, 16 Drawing Sheets

SYSTEMS AND METHODS FOR AUTOMATED GENERATION OF CUSTOMIZED CONTENT

FIELD OF THE INVENTION

The present technology relates to the field of content generation. More particularly, the present technology relates to automated generation of customized content.

BACKGROUND

Today, people often utilize computing devices (or systems) for a wide variety of purposes. For example, users can utilize computing devices to access a social networking system (or service). The users can utilize the computing devices to interact with one another, share content items, and view content items via the social networking system. For example, a user may share a content item, such as an image, a video, an article, or a link, via the social networking system. Other users may access the social networking system and interact with the shared content item.

SUMMARY

Various embodiments of the present technology can include systems, methods, and non-transitory computer readable media configured to determine a life story associated with a first user of a content sharing system. The life story can comprise a plurality of content items associated with the first user. The plurality of content items can be organized in chronological order. A determination is made that a second user has accessed the life story associated with the first user. The plurality of content items included in the life story are provided for presentation in a graphical user interface, wherein each content item is presented individually based on the chronological order.

In an embodiment, the life story comprises at least one content item that corresponds to a post, a story, a life event, a video, a link, a profile update, or a status update shared through the content sharing system.

In an embodiment, each content item is presented for a duration of time that corresponds to a respective display time associated with the content item.

In an embodiment, at least one content item is associated with at least one graphical overlay that is presented with the at least one content item.

In an embodiment, a timeline associated with the life story is provided in the graphical user interface, and wherein the timeline facilitates access to content items included in the plurality of content items.

In an embodiment, determining the life story further includes determining a set of content items associated with the first user; and filtering the set of content items to remove one or more content items.

In an embodiment, the one or more filtered content items include at least one content item that is associated with a negative sentiment.

In an embodiment, the negative sentiment is determined based on at least one of social interactions with the at least one content item by users of the content sharing system or a sentiment analysis of the at least one content item.

In an embodiment, content items included in the life story are curated manually or automatically.

In an embodiment, at least one content item included in the life story is identified based on a machine learning model that evaluates features associated with the at least one content item.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the present technology.

Figure 1:
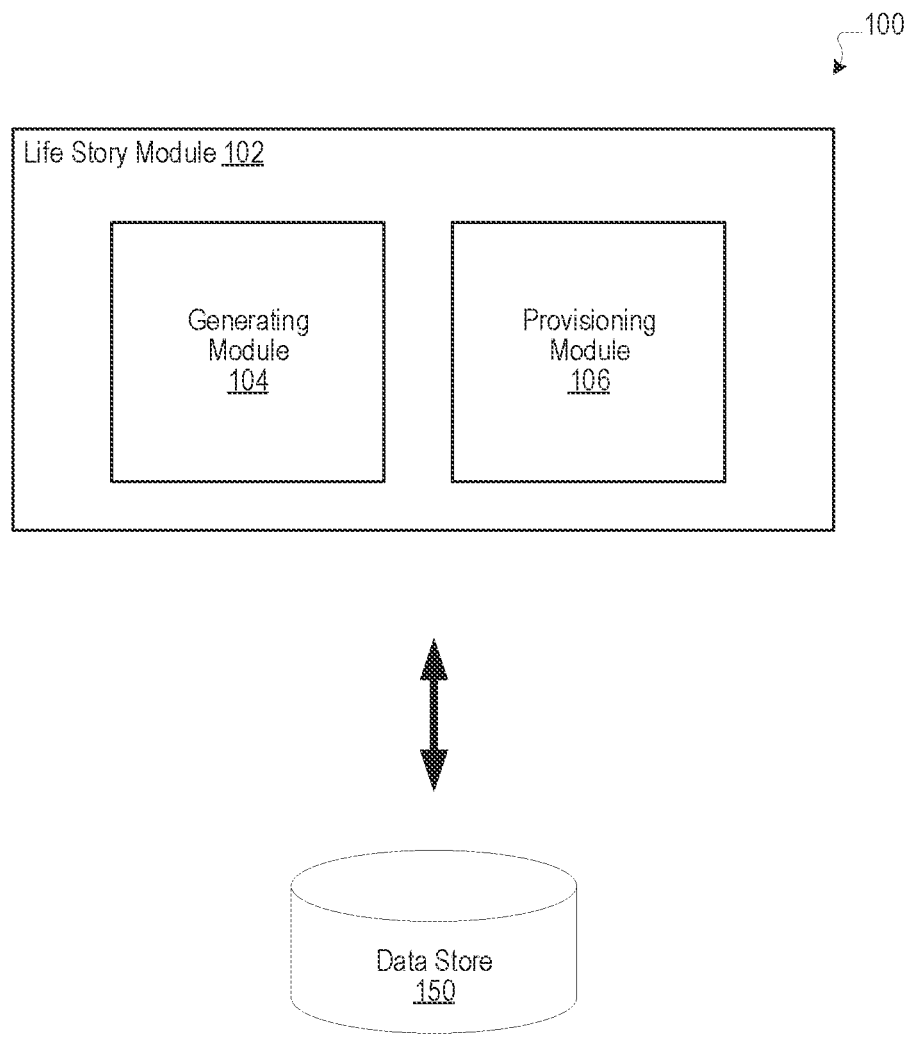
FIG. 1 illustrates an example system including a life story module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Today, people often utilize computing devices (or systems) for a wide variety of purposes. For example, users can utilize computing devices to access a social networking system (or service). The users can utilize the computing devices to interact with one another, share content items, and view content items via the social networking system. For example, a user may share a content item, such as an image, a video, an article, or a link, via the social networking system. Other users may access the social networking system and interact with the shared content item.

Under conventional approaches, users can express themselves by posting (or sharing) content items to a content sharing platform, such as a social networking system. Over time, content items shared by a given user can accumulate. As the number of shared content items continues to grow, content items that relate to important moments in a user's life can become buried among less meaningful content items. For example, a user may frequently share content items that reference memes. In this example, a content item that references the user's wedding day can be difficult to locate among the many content items that reference memes. As a result, it can be challenging for a user to highlight certain content items that capture important moments in the user's life over other content items that are less significant.

Similarly, other users that want to learn more about the user's life can be burdened by having to tediously sift through a potentially large number of less relevant content items shared by the user before more meaningful content can be seen. Such challenges can result in missed opportunities for users to engage with one another. Conventional approaches pose these and other problems arising in computer technology.

An improved approach rooted in computer technology overcomes the foregoing and other disadvantages associated with conventional approaches specifically arising in the realm of computer technology. In various embodiments, the present technology provides for generating a life story for a user that can be accessed through a content sharing platform, such as a social networking system. For example, the life story for the user can be created based on content items that are shared by the user or are otherwise associated with the user, such as content items in which the user is tagged or from which the user is otherwise recognized. Content items to be included in the life story can be curated manually or automatically. Under such approaches, content items that reference important moments in the user's life can be selected for inclusion in the life story. Such content items can reference major life events (e.g., weddings, anniversaries, birthdays, births, etc.), friendships (e.g., formation of a friendship, a friendship anniversary, etc.), life stages (e.g., school years, college years, etc.), and significant events (e.g., birth of a child, a new year's eve celebration, holidays, cultural events, starting a new company, moving to a new city, etc.), to name some examples. When the life story is accessed, each content item included in the life story can be provided for display in chronological order. Thus, the life story can provide a digital biography of the user as told through content items associated with the user. Viewers can access the life story to learn more about the user, for example, based on the chronological presentation of the content items. In some instances, the viewers can engage with the content items through social interactions (e.g., reactions, comments, etc.). As a result, the life story allows the user to highlight content items that reference key moments in the user's life. Moreover, viewers that access the life story can learn about the user's life based on an organized presentation of content items without having to sift through less relevant content. More details relating to the present technology are provided below.

FIG. 1 illustrates an example system 100 including a life story module 102, according to an embodiment of the present technology. The life story module 102 can generate and provide life stories for users of a content sharing system (e.g., a social networking system 630 of FIG. 6). As shown in the example of FIG. 1, the life story module 102 can include a generating module 104 and a provisioning module 106. In some instances, the example system 100 can include a data store 150 in communication with the life story module 102. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the generating module 104 and the provisioning module 106 can be implemented in any suitable combinations.

In some embodiments, the generating module 104 and the provisioning module 106 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some instances, the generating module 104 and the provisioning module 106 can be, in part or in whole, implemented as software running on one or more computing devices or systems, such as on a server system or a client computing device. In some instances, the generating module 104 and the provisioning module 106 can be, in part or in whole, implemented within or configured to operate in conjunction with or be integrated with a social networking system (or service), such as a social networking system 630 of FIG. 6. Likewise, in some instances, the generating module 104 and the provisioning module 106 can be, in part or in whole, implemented within or configured to operate in conjunction with or be integrated with a client computing device, such as the user device 610 of FIG. 6. For example, the generating module 104 and the provisioning module 106 can be implemented as or within a dedicated application (e.g., app), a program, or an applet running on a user computing device or client computing system. The application incorporating or implementing instructions for performing functionality of the generating module 104 and the provisioning module 106 can be created by a developer. The application can be provided to or maintained in a repository. In some instances, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The generating module 104 and the provisioning module 106 can be configured to communicate and/or operate with the data store 150, as shown in the example system 100. The data store 150 can be configured to store and maintain various types of data. In some implementations, the data store 150 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events and related time periods, pages, groups, posts, communications, content, feeds, account settings, privacy settings, a social graph, and various other types of data. In some embodiments, the data store 150 can store information that is utilized by the generating module 104 and the provisioning module 106. The data store 150 can store information about life stories associated with users. For example, the data store 150 can store content items that were selected for inclusion in a life story of a user, respective display times for the content items, and any graphical overlays associated with content items. It is contemplated that there can be many variations or other possibilities.

Figure 2A:
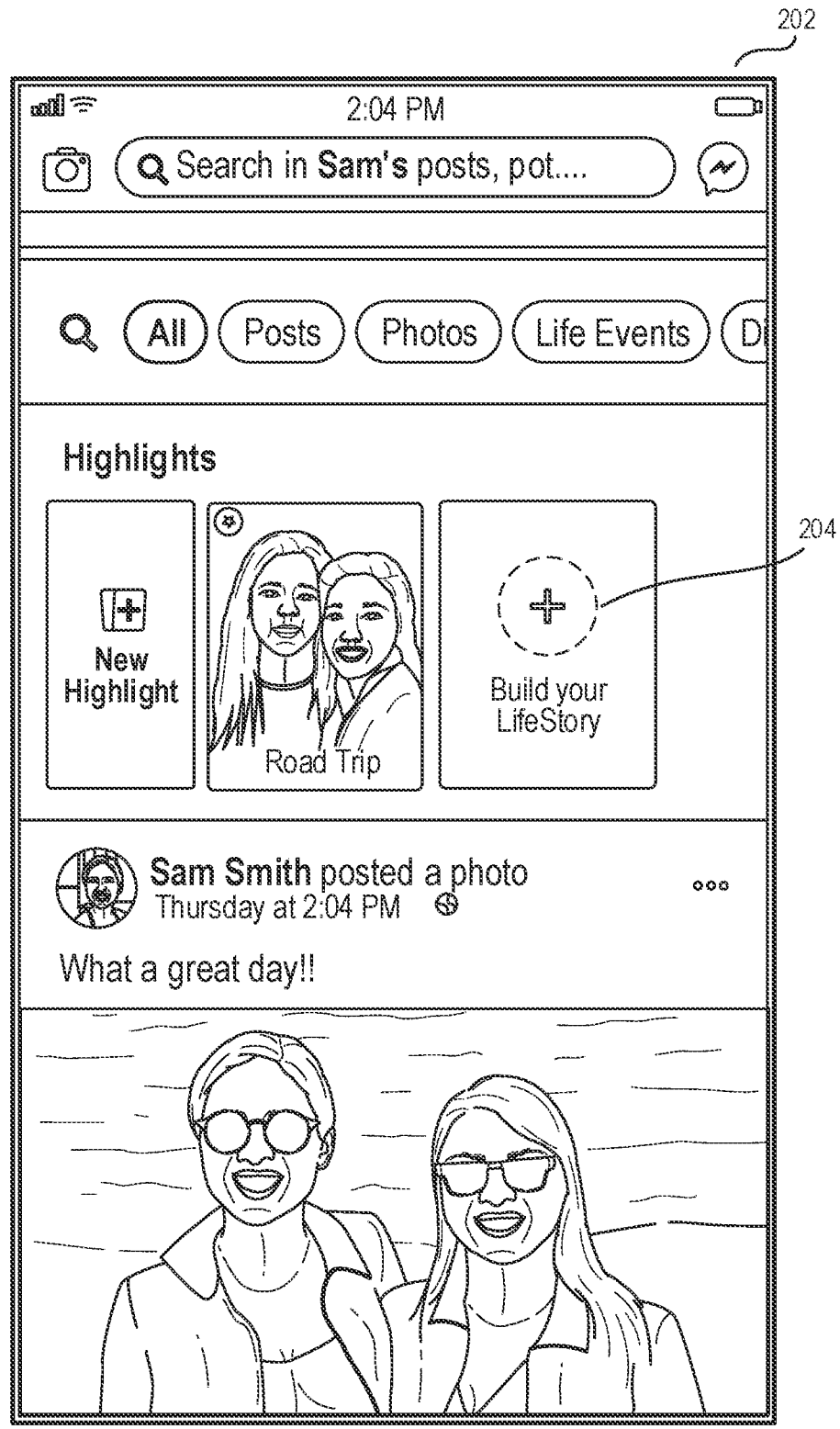
FIGS. 2A-2C illustrate a set of example graphical user interfaces, according to an embodiment of the present technology.
Figure 2B:
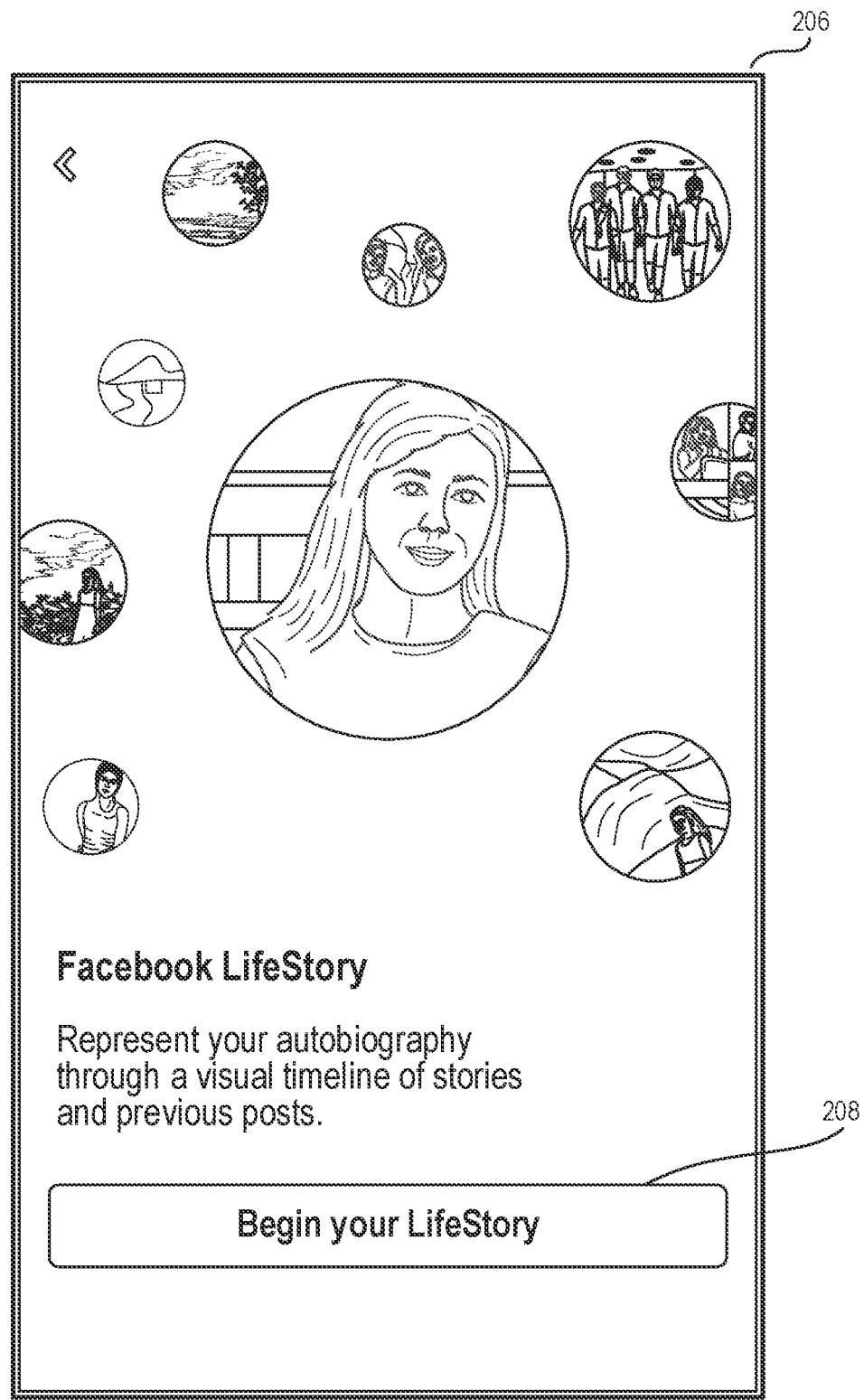
Figure 6:
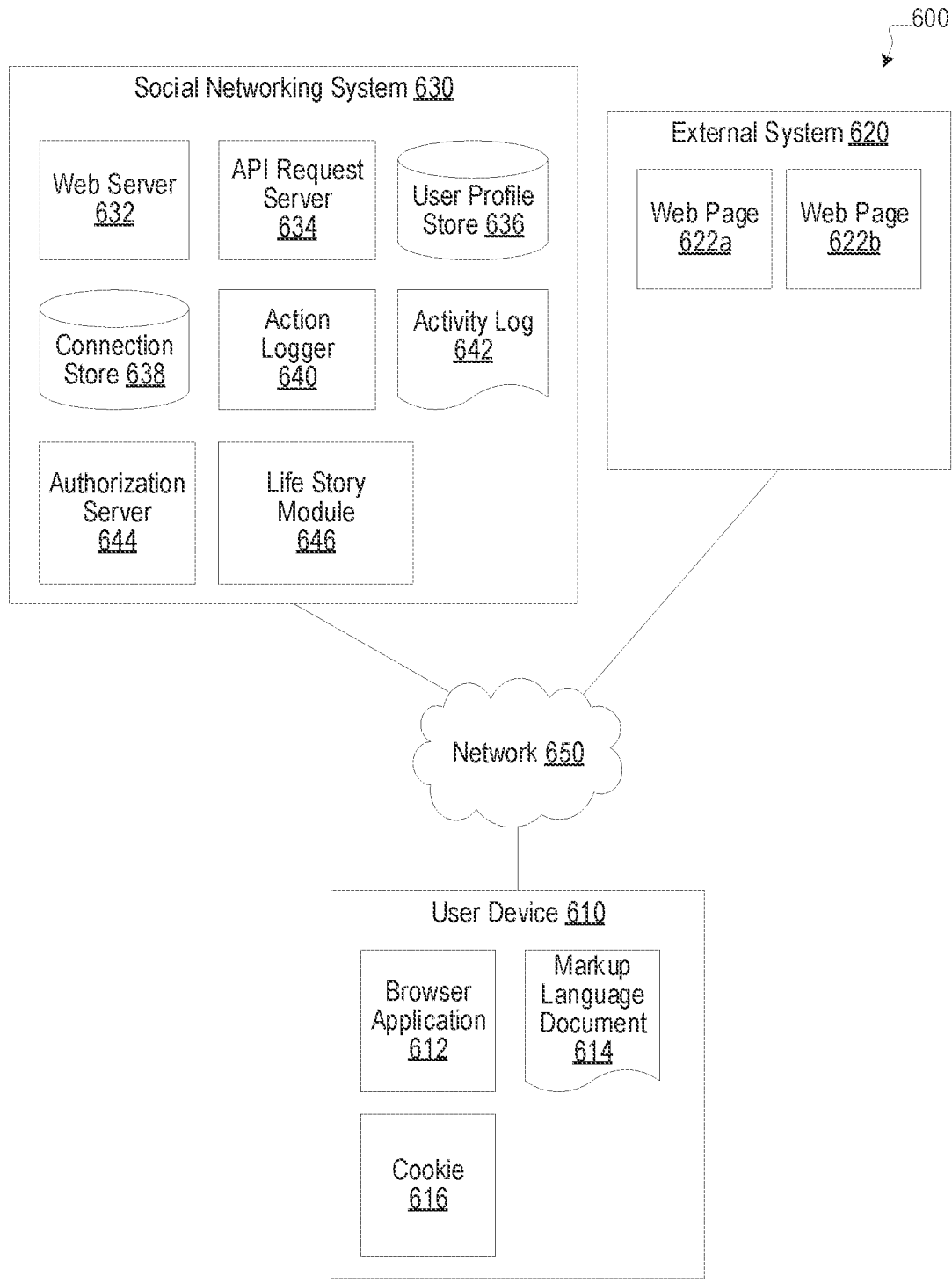
FIG. 6 illustrates a network diagram of an example system including an example social networking system that can be utilized in various scenarios, according to an embodiment of the present technology.

The generating module 104 can be configured to generate life stories for users of a content sharing system (e.g., the social networking system 630 of FIG. 6). In general, a life story can be created based on content items that are accessible through the content sharing system. In various embodiments, a life story for a given user can be created based on content items that are associated with the user in the content sharing system. Such content items may have been shared by the user or are otherwise associated with the user, such as content items in which the user is tagged or from which the user is otherwise recognized. As examples, such content items can comprise shared posts that include text (or captions) and/or media (e.g., images, videos, audio, etc.), stories (e.g., user-generated media collections), user-specified life events, links to other content (e.g., other posts, stories, websites, etc.), and updates to a user profile or status (e.g., adding a favorite book at a particular time, check-in at a significant location, marking oneself as being safe from a natural disaster or crisis, etc.). For example, a user of the content sharing system can build a life story by selecting an option 204 provided in an example interface 202 that can be presented through a display of a computing device of the user, as illustrated in FIG. 2A. An example interstitial interface 206 can be provided for presentation through the display of the computing device of the user in response to selection of the option 204, as illustrated in FIG. 2B. The interstitial page 206 can provide various information about a life story creation process. An option 208 provided in the interstitial page 206 can be selected to begin the process for creating the life story.

A life story for a user can be created based on a manual approach, an automatic approach, or a combination thereof. Under these approaches, a set of content items associated with the user are identified. Further, a subset of content items are selected from the set of content items for inclusion in the life story. Content items that are selected for inclusion in the life story can each be associated with a respective display time. When the life story is accessed, each content item can be provided for display for a time duration that corresponds to its associated display time. In some embodiments, display times associated with content items are fixed in duration. Thus, in such embodiments, each content item can be displayed for a pre-defined length of time (e.g., 15 seconds). In some embodiments, display times associated with content items can vary. In such embodiments, each content item can be displayed for a custom length of time. The custom length of time for a content item can be determined and refined by the generating module 104. For instance, a custom display time for a content item can be predicted based on a machine learning model that is trained based on training data associated with content items. Such training data can include an author of a content item, text associated with the content item, media associated with the content item, and user interactions with the content item (e.g., reactions, comments, reshares, etc.), to name some examples. Such training data also can include labels indicating how long content items were displayed or viewed when accessed by users. In an evaluation phase, the trained machine learning model can output a particular display time for a content item to be included in a life story. Many variations are possible.

Figure 2C:
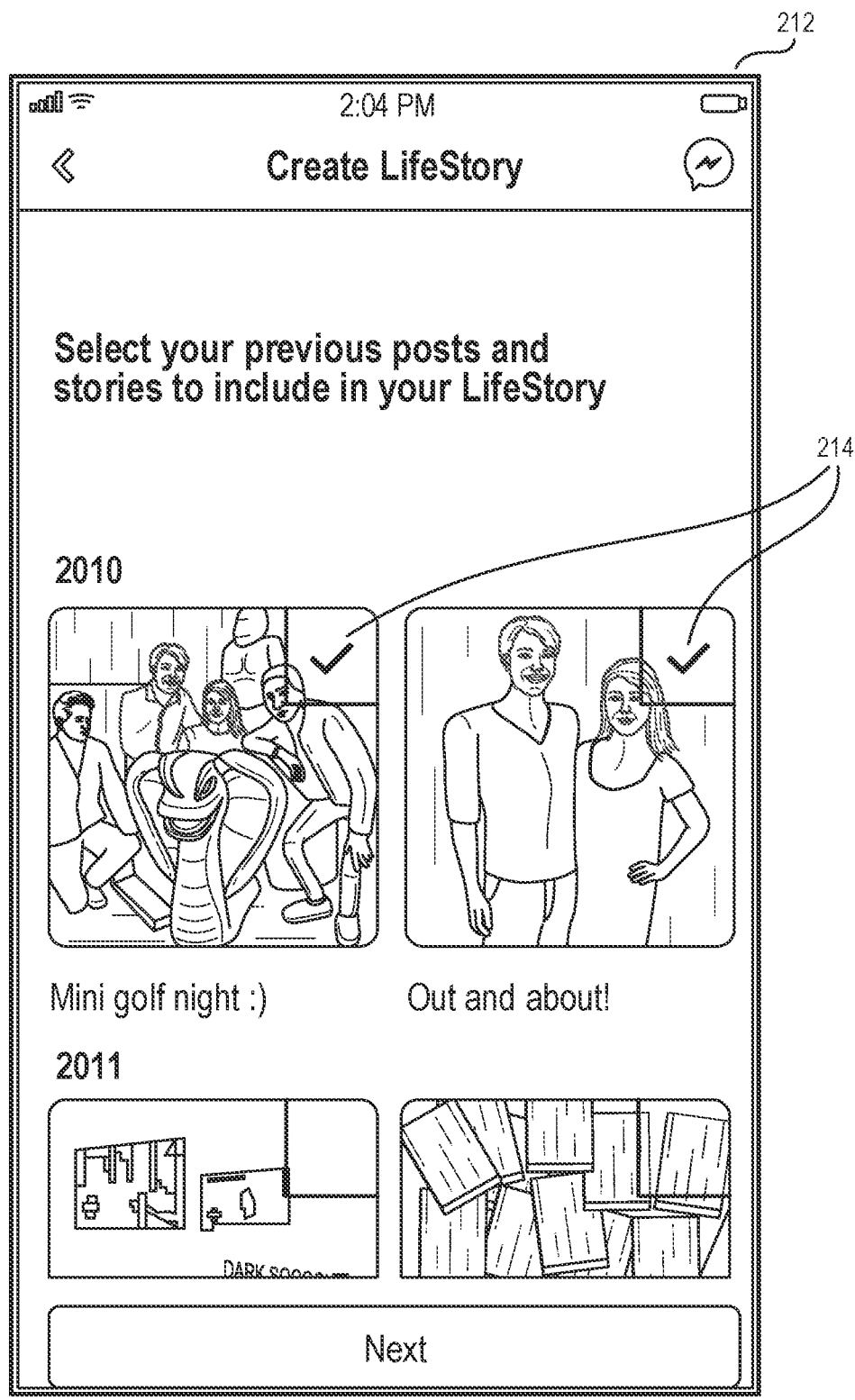

In various embodiments, under the manual approach, the generating module 104 can provide an example interface 212 for presentation through a display of a computing device of a user, as illustrated in FIG. 2C. The interface 212 can provide access to various content items associated with a user for whom a life story is being generated. In this example, the user (or a designated user) can interact with the interface 212 to individually select content items 214 to be included in the user's life story. The selected content items can be included in the life story in chronological order. When the life story is accessed, the content items included in the life story can be provided for presentation based on their respective display times. The manual approach thus allows manual curation of content items to be included in the life story. Once generated, the life story can be updated over time to remove content items or add new content items.

In various embodiments, under the automatic approach, the generating module 104 can automatically identify content items to be included in a life story for a user without requiring manual selection of content items. The generating module 104 can automatically identify content items based on a number of techniques. In some embodiments, the generating module 104 can identify all content items associated with the user. As mentioned, such content items can include, for example, posts, stories, life events, videos, links, profile updates, and status updates. The generating module 104 can rank the identified content items. For example, content items that were originally posted by the user can be ranked higher than other content items. For instance, a content item that was originally posted by the user can be ranked higher than a content item that was simply reshared by the user. In another example, a content item can be ranked based on a number of interactions with the content item (e.g., likes, comment, shares, etc.). The generating module 104 can filter the ranked content items to remove undesirable content items. For example, undesirable content items may include or reference individuals with whom the user no longer associates, such as former romantic partners. Such individuals may be identified based on information provided in a profile associated with the user. For example, based on changes to the profile, a determination can be made that the user is no longer in a relationship with a person. The change in the relationship status can serve as a signal to remove content items that depict or reference that person unless inclusion of such content items is desired. Many variations are possible. For example, in some embodiments, content items that depict or reference users that have a low social affinity score (or relationship score) with the user can also be removed unless inclusion of such content items is desired. Similarly, in some embodiments, content items that depict or reference negative events (e.g., a personal loss, disaster, etc.) can be removed. In some embodiments, the generating module 104 can remove content items that are associated with a negative sentiment. The generating module 104 can determine a level of sentiment associated with a content item based on social media signals. For example, users of the content sharing system can engage with the content item using reactions. As examples, the reactions can include a like option, a heart option, a care option, a funny option, a surprise option, a sad option, and an angry option, to name some examples. In some embodiments, a content item that is associated with a threshold amount (e.g., count, percentage, etc.) of positive reactions (e.g., like reactions, heart reactions, funny reactions, care reactions) can be identified as having a positive sentiment. In contrast, a content item that is associated with a threshold amount (e.g., count, percentage, etc.) of negative reactions (e.g., sad reactions, angry reactions) can be identified as having a negative sentiment. Other approaches for determining sentiment are contemplated. For example, conventional sentiment analysis techniques can be applied to text and/or media associated with a content item (or comments posted in response to the content item) to classify the content item as having a positive sentiment or a negative sentiment. After filtering, the generating module 104 can generate the life story based on the remaining content items. For example, the generating module 104 can select an amount (e.g., count, percentage) of the best ranking content items for inclusion in the life story. As an example, the generating module 104 may select the top 10 percent of the best ranking content items for inclusion in the life story. Other approaches for determining content items to include in a life story are contemplated. For example, in some embodiments, the generating module 104 can train and apply a machine learning model that determines whether to include a content item in a life story based on training data associated with content items. Such training data can include an author of the content item, text associated with the content item, media associated with the content item, and user interactions with the content item (e.g., reactions, comments, reshares, etc.), to name some examples. Such training data also can include labels indicating whether a content item should be included in a life story. In an evaluation phase, the trained machine learning model can output a likelihood that a content item should be included in a life story In various embodiments, a life story for a user can be generated based on a combined approach. Under this approach, the generating module 104 can automatically propose content items to be included in the life story. The content items can be identified using any of the techniques described above in reference to the automatic process. Further, the proposed content items can be reviewed and manually approved for inclusion in the life story. For example, the content items can be reviewed and approved by the user or another user that is designated by the user. Further, the user (or the designated user) can manually add content items that may not have been identified by the automatic approach. Likewise, the user (or the designated user) can manually remove content items that were automatically identified for inclusion in the life story.

The generating module 104 can optionally associate content items included in a life story with graphical overlays. A graphical overlay may include text and/or media that describes a context associated with a single content item or a group of related content items. In some embodiments, a graphical overlay can be generated for a content item that introduces a life story. In such embodiments, the graphical overlay can provide a title of the life story, a date range associated with the life story, and one or more images of a user associated with the life story. In another example, a graphical overlay can be generated for a group of related content items. For example, a life story may include a number of content items that relate to a college graduation. In this example, a graphical overlay introducing the related content items can be provided (e.g., "Graduation Day") in one or more of the related content items. In yet another example, a graphical overlay can be generated for a content item that references a major life event. For example, a content item reflecting people getting married can be presented with a "Wedding Day" graphical overlay. Many variations are possible. When determining a graphical overlay for a content item, the generating module 104 can determine a context associated with the content item based on various signals. For example, in some embodiments, the generating module 104 can determine a context associated with the content item based on a geographic location and timestamp associated with the content item. An event calendar that identifies various events (e.g., cultural events, religious events, holidays, etc.) that occur throughout the world can be used to identify an event that corresponds to the geographic location and timestamp associated with the content item. In such embodiments, the generating module 104 can associate the content item with a graphical overlay that corresponds to the identified event (e.g., "Merry Christmas", "Happy Holi", "Happy Lunar New Year", etc.). In some embodiments, the generating module 104 can determine a context associated with a content item based on comments that were posted in response to the content item. In such embodiments, the comments can be analyzed based on various text and media analysis techniques (e.g., keyword matching, NLP, machine learning predictions, etc.) to identify an event associated with the content item. For example, the comments may include wishes for a happy wedding anniversary. In this example, the generating module 104 can determine that the content item is associated with a wedding anniversary. Accordingly, the generating module 104 can associate the content item with a graphical overlay that provides a visual indication of the wedding anniversary. In some embodiments, the generating module 104 can determine a context associated with a content item based on an activity associated with the content item. For example, a user that posted the content item can specify an activity (e.g., watching the big game, traveling to Africa, etc.) associated with the content item. In such embodiments, the activity can be used to determine the context associated with the content item. Based on the activity, the generating module 104 can identify a graphical overlay to be associated with the content item. For example, a group of content items that relate to a trip to Africa can be associated with a corresponding graphical overlay, such as "2019 Trip to Africa". In some embodiments, the generating module 104 can determine a context associated with a content item based on check-in information. For example, a user that posted the content item can specify check-in information that identifies an event or point of interest. In such embodiments, the check-in information can be used to determine the context associated with the content item. Based on the check-in information, the generating module 104 can identify a graphical overlay to be associated with the content item. In some embodiments, if a context cannot be determined, a graphical overlay that references a date or year associated with a content item (or group of content items) can be provided.

In some instances, a life story may be created as a memorial for a user who has passed. Here, the life story can memorialize the deceased user's life using content items that are associated with the user. In some embodiments, a life story can be created by a user prior to passing. In such embodiments, the life story can be converted to a memorial after a determination is made that the user has passed. In some embodiments, a user can designate a responsible user who will create a memorial for the user. In general, any of the approaches described herein can be used to curate content items to be included in the life story of a deceased user.

Figure 3A:
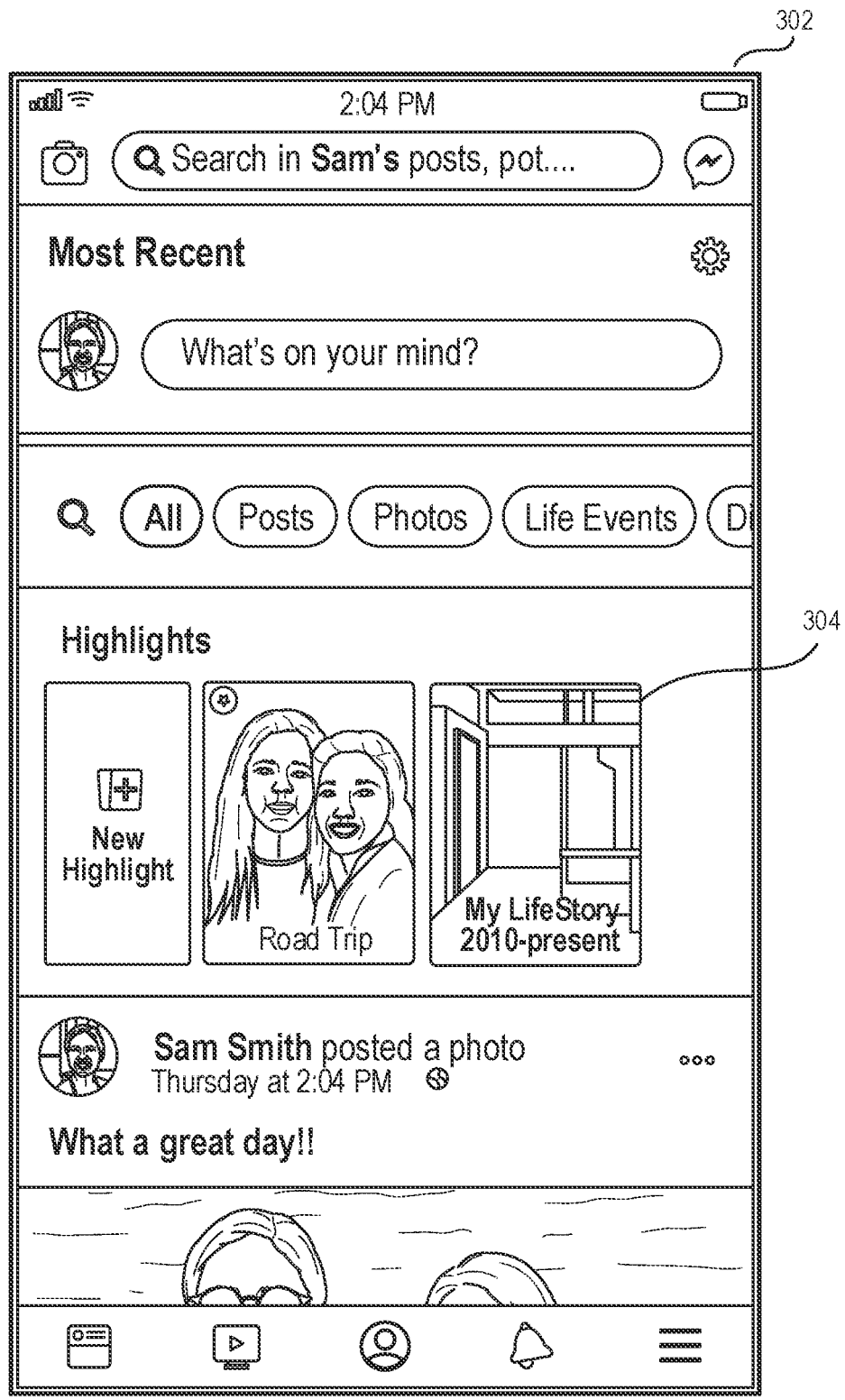
FIGS. 3A-3G illustrate another set of example graphical user interfaces, according to an embodiment of the present technology.
Figure 3B:
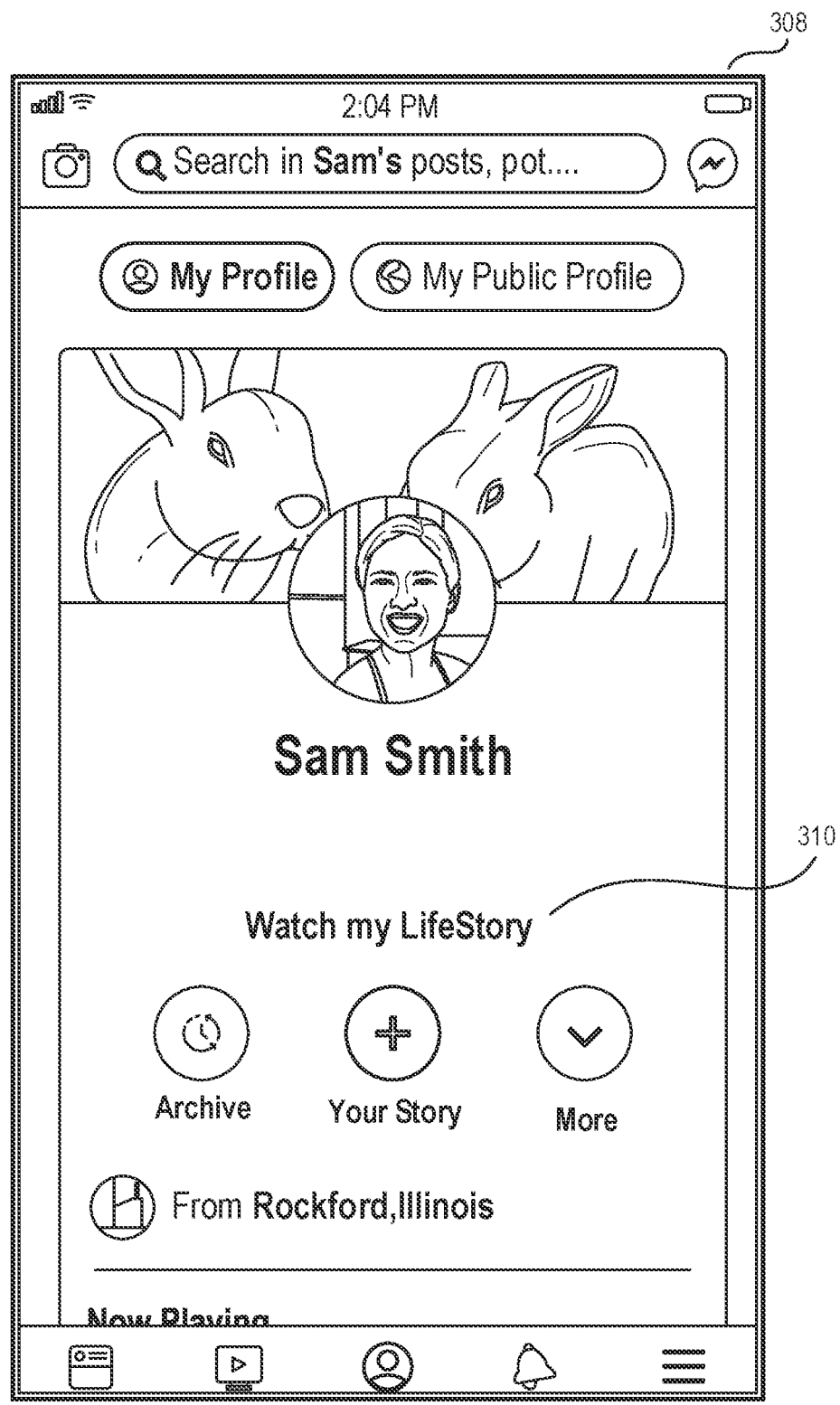
Figure 3C:
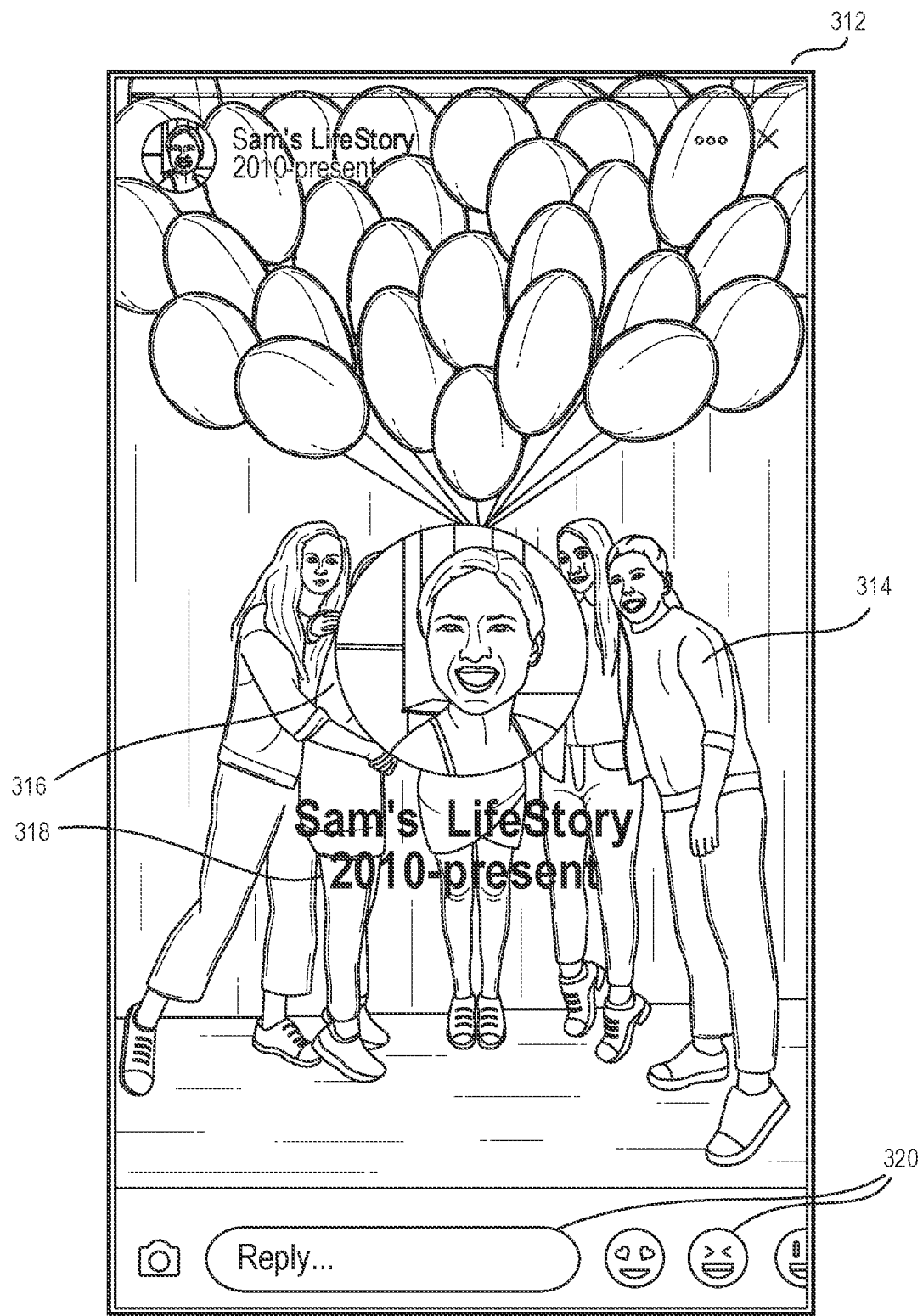
Figure 3D:
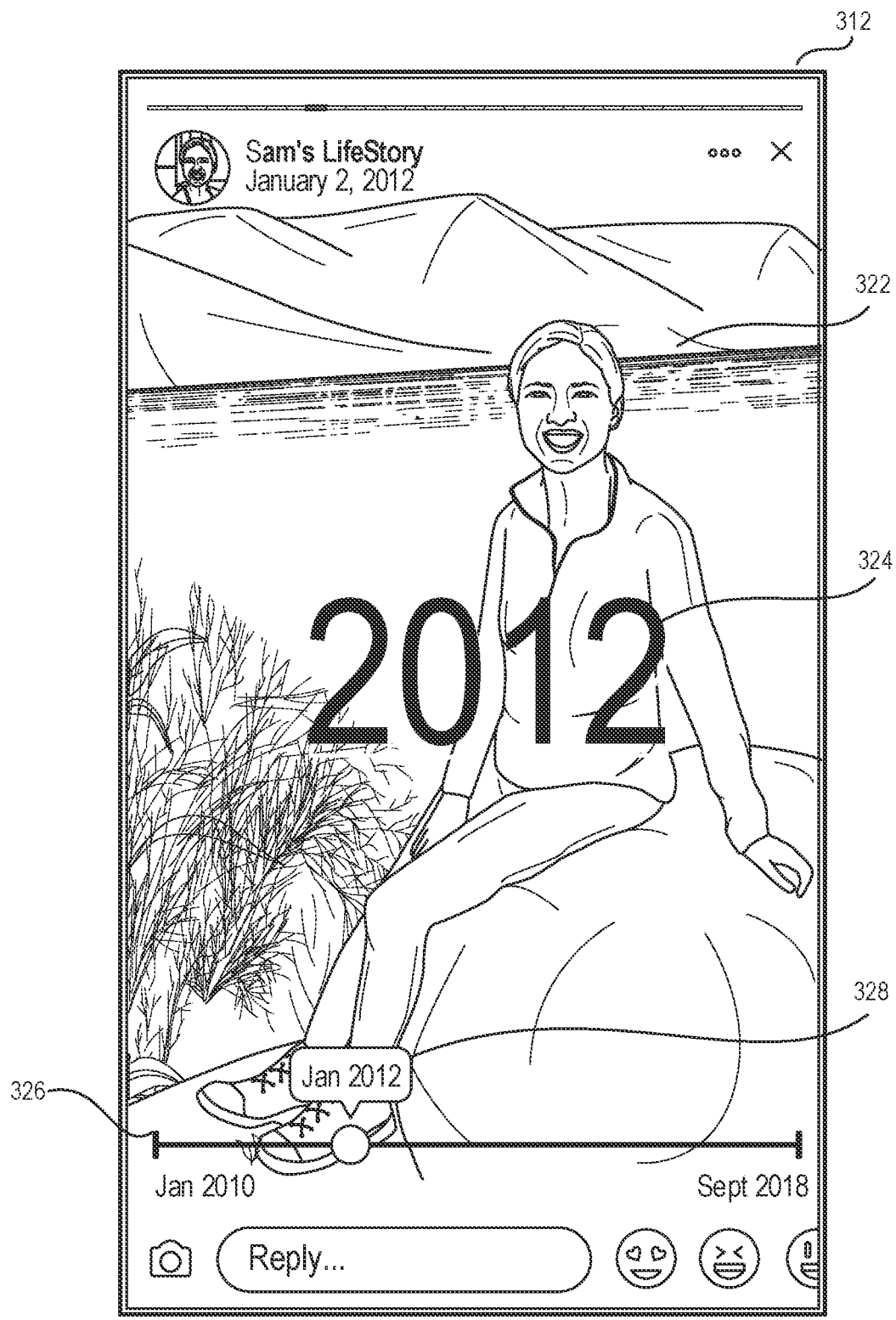
Figure 3E:
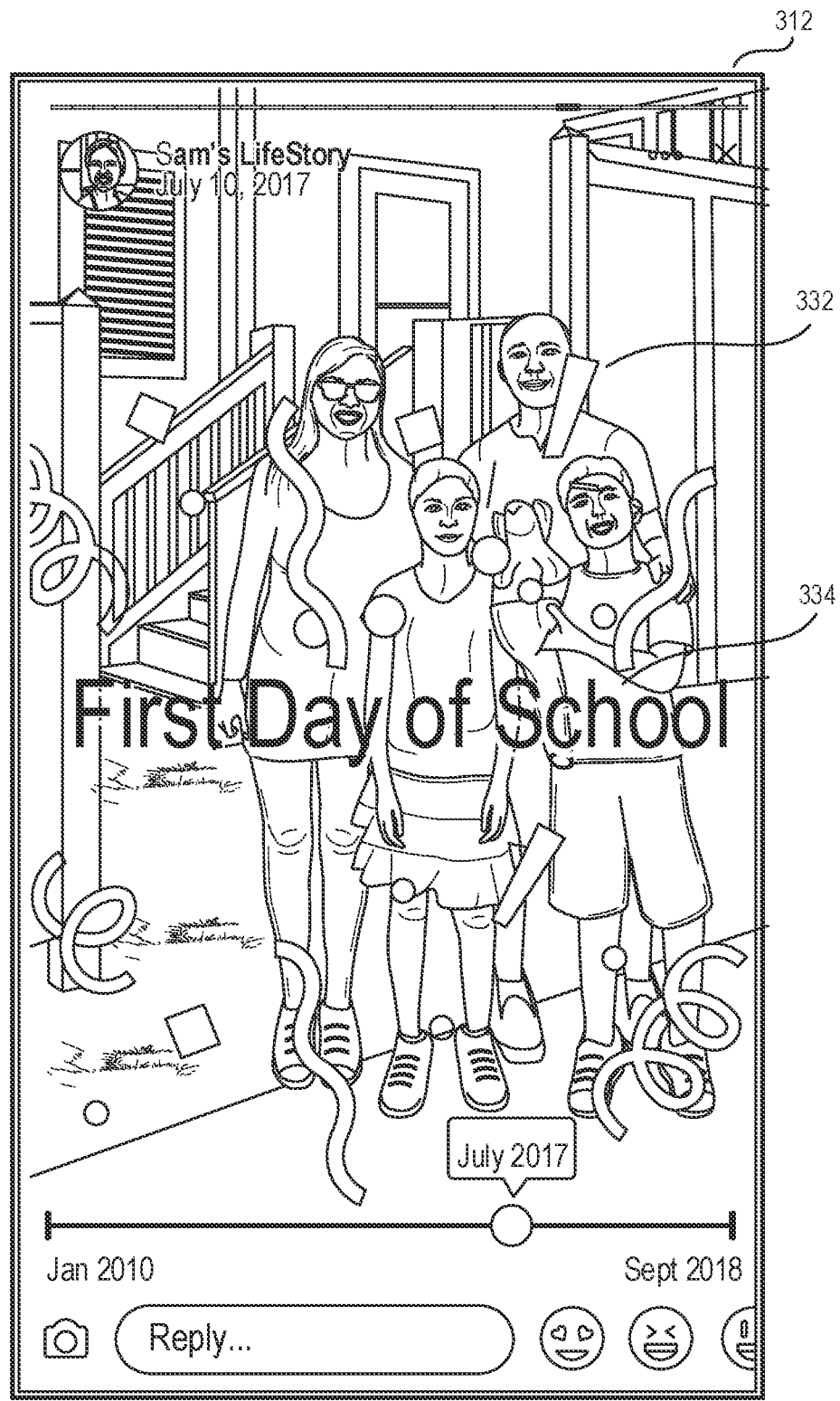
Figure 3F:
Figure 3G:
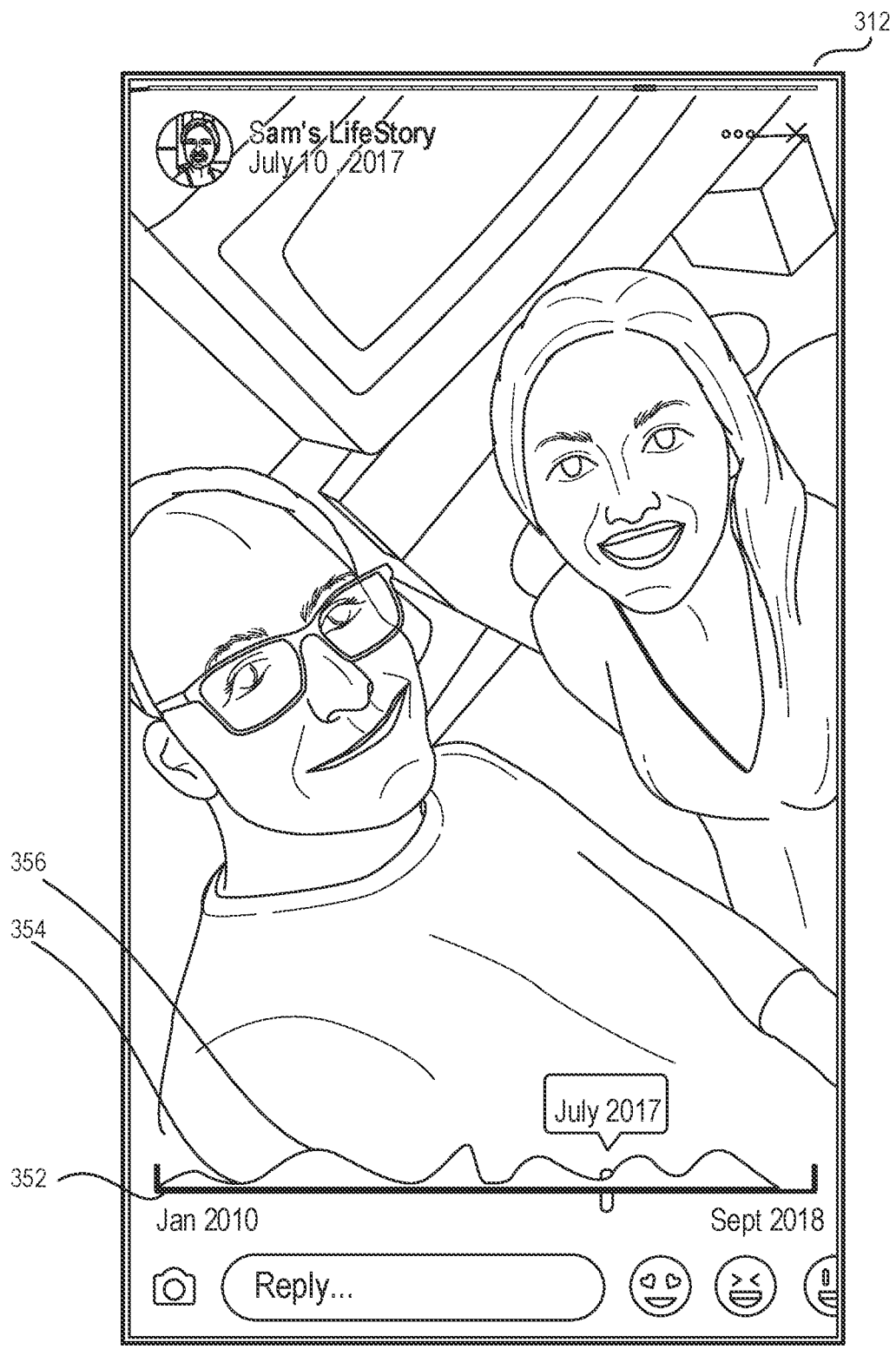

Once a life story for a user is generated, the life story can be made accessible to other users of the content sharing system. For example, an option 304 in an example interface 302 can be provided for presentation through a display of a computing device of a viewer, as illustrated in FIG. 3A. The option 304 can be selected to access the life story. In another example, a profile interface 308 associated with the user can be provided for presentation through the display of the computing device of the viewer, as illustrated in FIG. 3B. The life story may be accessed through an option 310 provided in the profile interface 308 associated with the user. When the life story is accessed, the provisioning module 106 can provide the life story for presentation on a display screen. For example, FIG. 3C illustrates an example interface 312 that can be provided for presentation through the display of the computing device of the viewer. The interface 312 provides access to the life story. When the life story is provided for presentation, a content item 314 included in the life story can be shown. In some embodiments, the provisioning module 106 can provide graphical overlays with the content item 314. For example, in FIG. 3C, a profile image 316 of the user and a title/date range 318 associated with the life story (e.g., "Sam's LifeStory", "2010-present") can be provided as overlays. Viewers accessing the life story can interact with individual content items based on various options 320 (e.g., react, comment, etc.). As presentation of the life story progresses, additional content items that were included in the life story can each be shown for some duration of time in chronological order. For example, FIG. 3D illustrates another content item 322 that is included in the life story. In FIG. 3D, the interface 312 displays an overlay 324 associated with the content item 322 (e.g., "2012"). The interface 312 also provides a timeline 326 for navigating the life story. A viewer accessing the interface 312 can perform various operations (e.g., scrubbing, tap-based gestures, etc.) through the timeline 326 to navigate (or skip) to other locations or content items included in the life story. The timeline 326 can show a corresponding timestamp 328 associated with the content item 322 being presented. Many variations are possible. FIG. 3E illustrates another example content item 332 provided within the interface 312 with a corresponding overlay 334 (e.g., "First Day of School"). The provisioning module 106 can be configured to provide different types of timelines for navigating the life story. For example, in some embodiments, a social timeline 342 can be provided, as illustrated in FIG. 3F. The social timeline 342 can include profile pictures 344 of users that are associated with content items included in the life story (e.g., users referenced in content items, users tagged in content items, etc.). A profile picture of a user associated with a content item can be positioned on the social timeline 342 based on a timestamp associated with the content item. In some embodiments, the profile pictures 344 provided on the social timeline 342 can vary based on social connections shared between the user associated with the life story and a different viewer of the life story. For example, profile pictures of users that are social connections of the viewer can be prioritized for display in the social timeline 342 over profile pictures of users that are not social connections. Profile pictures of users to be prioritized can, as one example, appear larger than other profile pictures. In other embodiments, a frequency timeline 352 can be provided, as illustrated in FIG. 3G. The frequency timeline 352 can indicate a volume (or quantity) of content items that were posted (or shared) by the user associated with the life story over time. The changes in volume (or quantity) can be represented based on changes in amplitude of a curve of the frequency timeline 352. For example, a local minimum 354 associated with a period of time can indicate that a low volume of content items were posted (or shared) by the user during that period of time. In contrast, a local maximum 356 associated with a period of time can indicate that a high volume of content items were posted (or shared) by the user during that period of time.

Figure 4A:
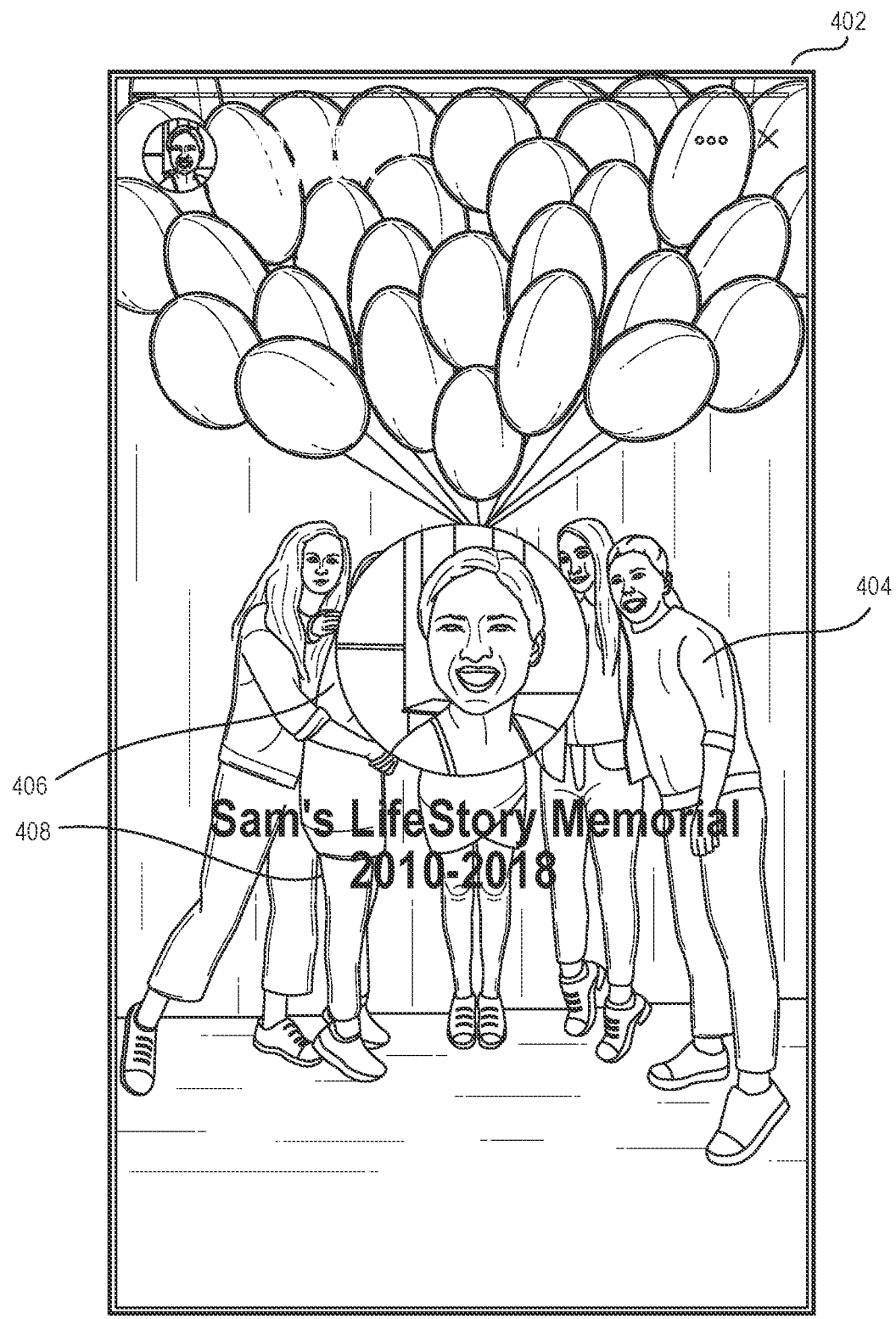
FIGS. 4A-4B illustrate yet another set of example graphical user interfaces, according to an embodiment of the present technology.
Figure 4B:
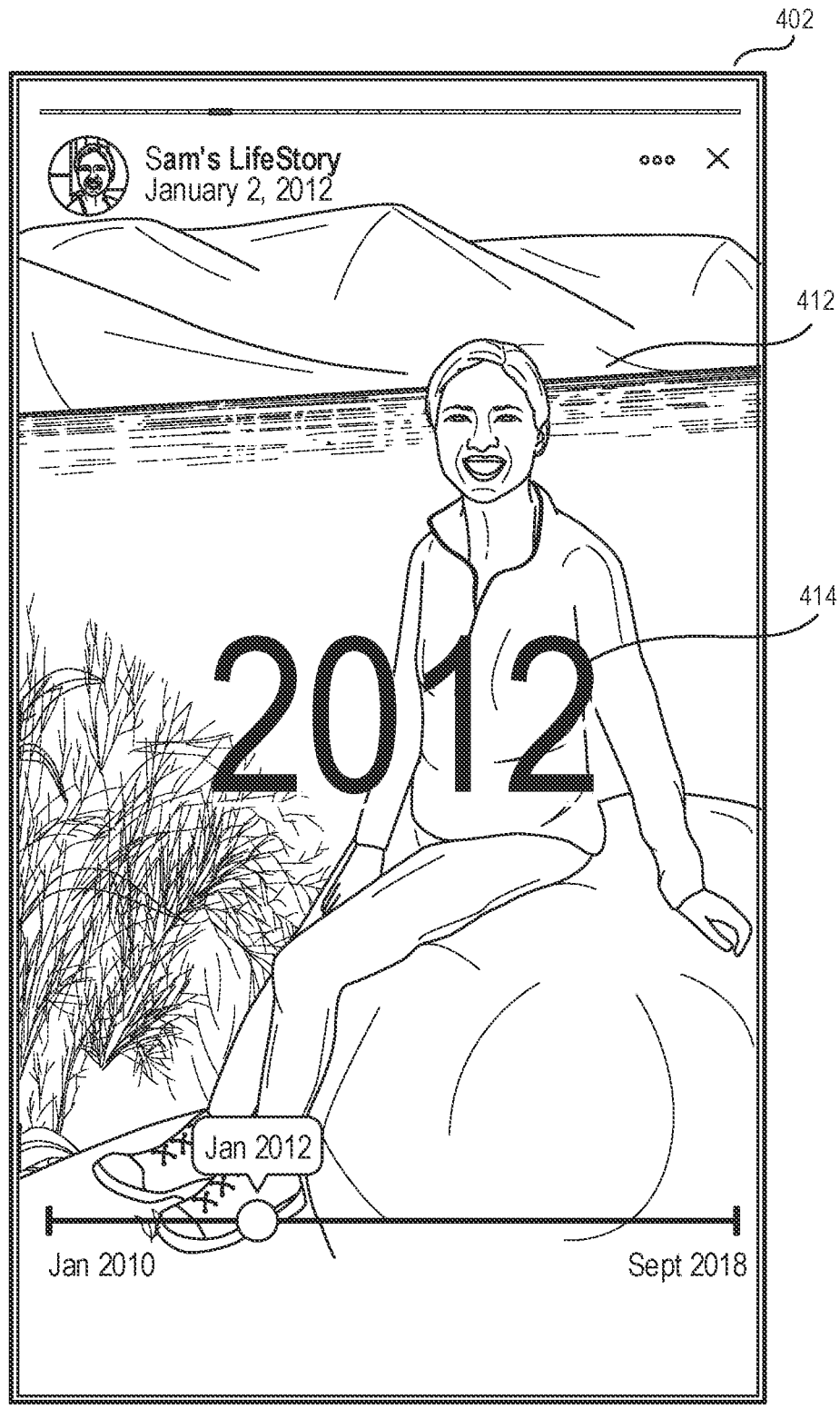

As mentioned, in some instances, a life story can be created as a memorial for a deceased user. In such instances, when the life story is accessed, the provisioning module 106 can provide the life story for presentation on a display screen. For example, FIG. 4A illustrates an example interface 402 that can be provided for presentation through a display screen of a computing device of a viewer. The interface 402 provides access to the life story. When the life story is provided for presentation, a content item 404 included in the life story can be shown first. In some embodiments, the provisioning module 106 can superimpose introductory details on the content item 404. For example, in FIG. 4A, a profile image of the deceased user 406 and a title/date range 408 associated with the life story (e.g., 2010-2018) are provided as graphical overlays. In various embodiments, when presenting the memorial, the interface 402 does not provide options to interact with individual content items. That is, viewers of the memorial are not permitted to submit reactions or comments for content items included in the life story. As presentation of the life story progresses, additional content items included in the memorial can each be shown for some duration of time in chronological order. For example, FIG. 4B illustrates another content item 412 that is included in the life story memorial. Further, an overlay 414 associated with the content item 412 can also be provided. Many variations are possible.

The provisioning module 106 can be configured to enforce privacy restrictions associated with content items included in a life story. For example, a life story can include content items that were shared publicly with all users of the content sharing system and also content items that were shared privately with a restricted group of users (e.g., social connections, friends, etc.). When the life story is accessed by a viewer, the provisioning module 106 can provide an augmented version of the life story that only includes content items that the viewer has permission to access. Thus, different users can be provided with different versions of the life story. For example, a viewer that is not a social connection can be provided a public version of the life story that only includes content items that are publicly accessible. In contrast, a viewer that is a social connection can be provided a more detailed version of the life story that includes both publicly and privately shared content items. Many variations are possible.

Figure 5:
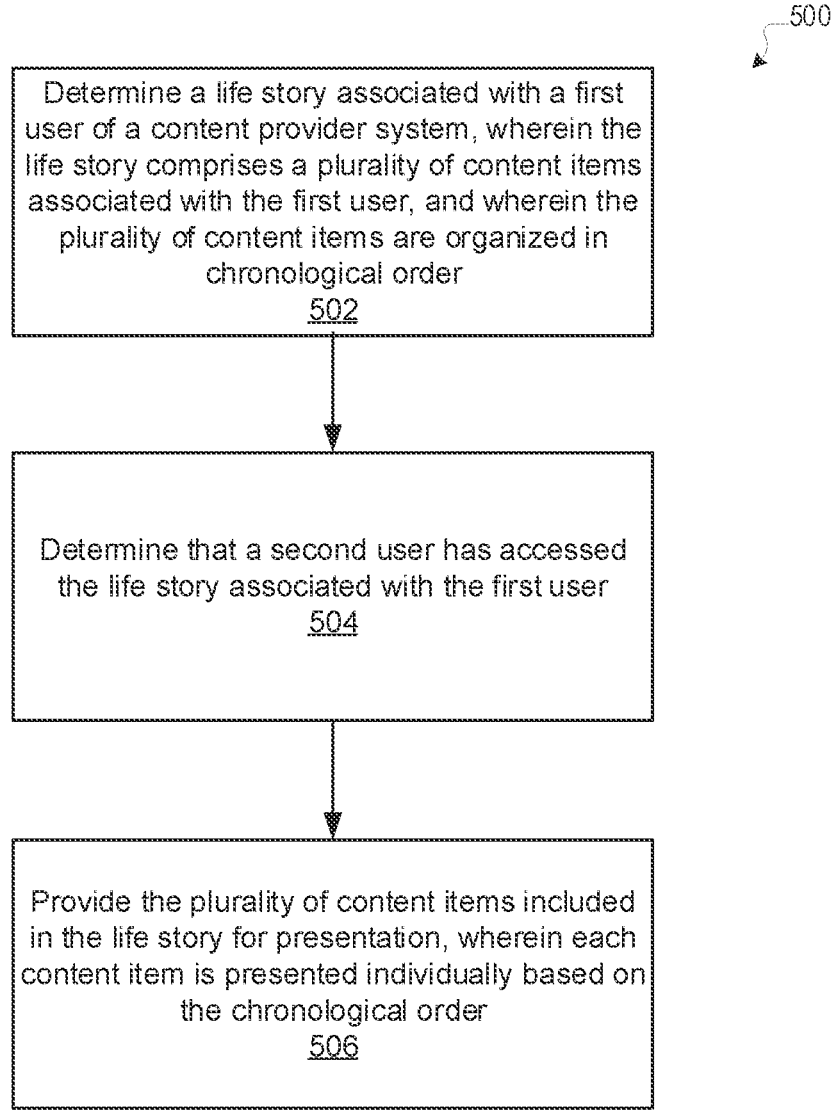
FIG. 5 illustrates an example method, according to an embodiment of the present technology.

FIG. 5 illustrates an example method 500, according to an embodiment of the present technology. It should be understood that there can be additional, fewer, or alternative steps performed in similar or alternative orders, or in parallel, based on the various features and embodiments discussed herein unless otherwise stated. At block 502, the example method 500 can determine a life story associated with a first user of a content sharing system. The life story can comprise a plurality of content items associated with the first user. The plurality of content items can be organized in chronological order. At block 504, the example method 500 can determine that a second user has accessed the life story associated with the first user. At block 506, the example method 500 can provide the plurality of content items included in the life story for presentation in a graphical user interface, wherein each content item is presented individually based on the chronological order.

It is contemplated that there can be many other uses, applications, and/or variations associated with the various embodiments of the present technology. For example, in some cases, a user can choose whether or not to opt-in to utilize the present technology. The present technology can also ensure that various privacy settings and preferences are maintained and can prevent private information from being divulged. In another example, various embodiments of the present technology can learn, improve, and/or be refined over time.

Social Networking System—Example Implementation

FIG. 6 illustrates a network diagram of an example system 600 that can be utilized in various scenarios, according to an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a life story module 646. The life story module 646 can be implemented with, for example, the life story module 102, as discussed in more detail herein. In some embodiments, the life story module 646, or aspects thereof, can be implemented in the user device 610. It should be appreciated that there can be many variations or other possibilities.

Hardware Implementation

Figure 7:
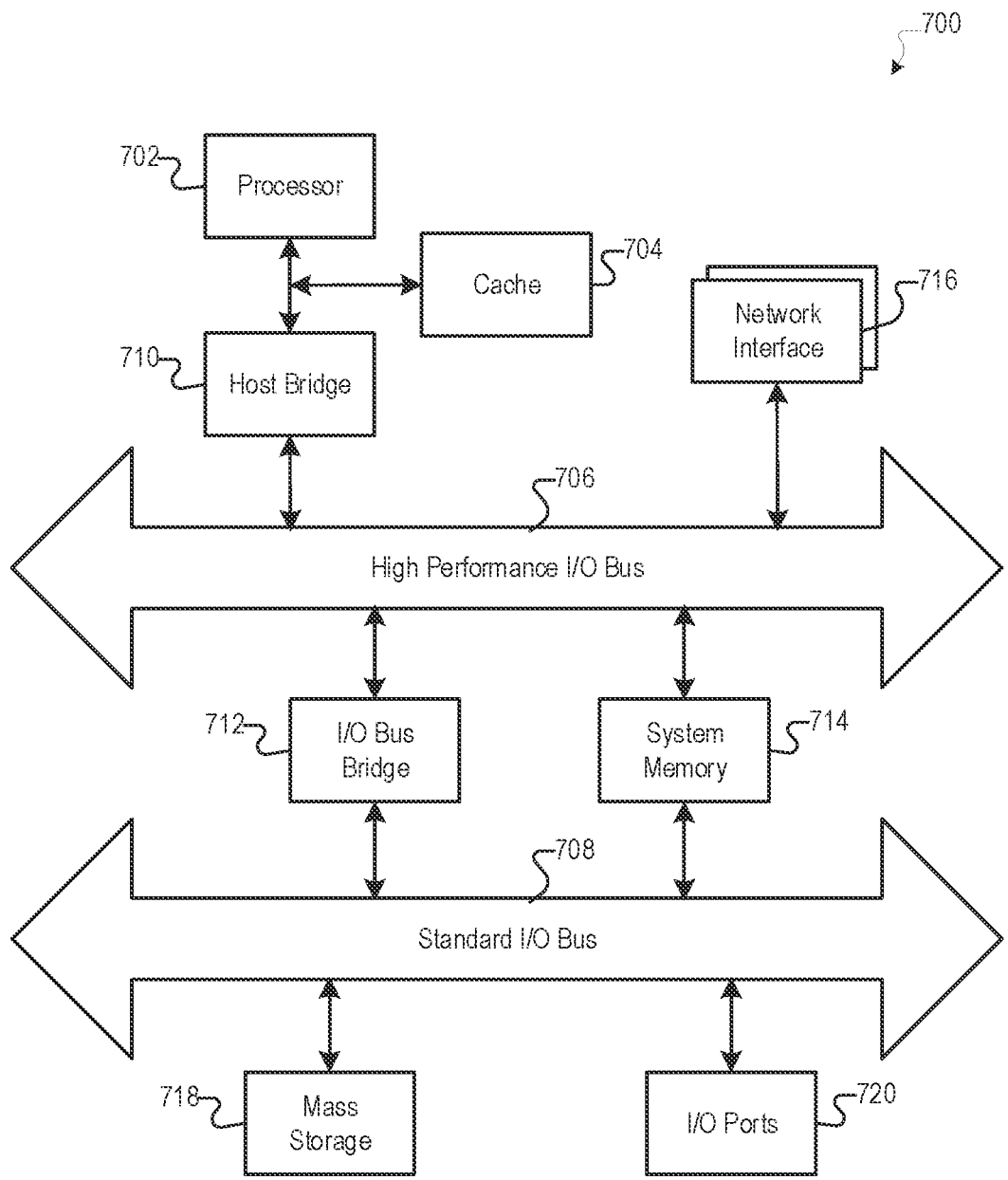
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, California, and the x86-compatible processors manufactured by Advanced Micro Devices (AMD), Inc., of Sunnyvale, California, as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the present technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, a life story associated with a first user of a content sharing system, wherein the life story comprises a plurality of content items associated with the first user, and wherein the plurality of content items are automatically selected for the life story from a set of content items associated with the first user without selection by the first user;
   determining, by the computing system, that a second user has accessed the life story associated with the first user; and
   providing, by the computing system, the plurality of content items included in the life story for presentation in a graphical user interface, wherein each content item is presented individually based on a chronological order.

2. The computer-implemented method of claim 1, wherein the life story comprises at least one content item that corresponds to a post, a story, a life event, a video, a link, a profile update, or a status update shared through the content sharing system.

3. The computer-implemented method of claim 1, wherein each content item is presented for a duration of time that corresponds to a respective display time associated with the content item.

4. The computer-implemented method of claim 1, wherein at least one content item is associated with at least one graphical overlay that is presented with the at least one content item.

5. The computer-implemented method of claim 1, wherein a timeline associated with the life story is provided in the graphical user interface, and wherein the timeline facilitates access to content items included in the plurality of content items.

6. The computer-implemented method of claim 1, wherein determining the life story further comprises:
   determining, by the computing system, a set of content items associated with the first user; and
   filtering, by the computing system, the set of content items to remove one or more filtered content items.

7. The computer-implemented method of claim 6, wherein the one or more filtered content items include at least one content item that is associated with a negative sentiment.

8. The computer-implemented method of claim 7, wherein the negative sentiment is determined based on at least one of social interactions with the at least one content item by users of the content sharing system or a sentiment analysis of the at least one content item.

9. The computer-implemented method of claim 1, wherein content items included in the life story are curated manually or automatically.

10. The computer-implemented method of claim 1, wherein at least one content item included in the life story is identified based on a machine learning model that evaluates features associated with the at least one content item.

11. A system comprising:
    at least one processor; and
    a memory storing instructions that, when executed by the at least one processor, cause the system to perform:
       determining a life story associated with a first user of a content sharing system, wherein the life story comprises a plurality of content items associated with the first user, and wherein the plurality of content items are automatically selected for the life story from a set of content items associated with the first user without selection by the first user;
       determining that a second user has accessed the life story associated with the first user; and
       providing the plurality of content items included in the life story for presentation in a graphical user interface, wherein each content item is presented individually based on a chronological order.

12. The system of claim 11, wherein the life story comprises at least one content item that corresponds to a post, a story, a life event, a video, a link, a profile update, or a status update shared through the content sharing system.

13. The system of claim 11, wherein each content item is presented for a duration of time that corresponds to a respective display time associated with the content item.

14. The system of claim 11, wherein at least one content item is associated with at least one graphical overlay that is presented with the at least one content item.

15. The system of claim 11, wherein a timeline associated with the life story is provided in the graphical user interface, and wherein the timeline facilitates access to content items included in the plurality of content items.

16. A non-transitory computer-readable storage medium including instructions that, when executed by at least one processor of a computing system, cause the computing system to perform:
    determining a life story associated with a first user of a content sharing system, wherein the life story comprises a plurality of content items associated with the first user, and wherein the plurality of content items are automatically selected for the life story from a set of content items associated with the first user without selection by the first user;
    determining that a second user has accessed the life story associated with the first user; and
    providing the plurality of content items included in the life story for presentation in a graphical user interface, wherein each content item is presented individually based on a chronological order.

17. The non-transitory computer-readable storage medium of claim 16, wherein the life story comprises at least one content item that corresponds to a post, a story, a life event, a video, a link, a profile update, or a status update shared through the content sharing system.

18. The non-transitory computer-readable storage medium of claim 16, wherein each content item is presented for a duration of time that corresponds to a respective display time associated with the content item.

19. The non-transitory computer-readable storage medium of claim 16, wherein at least one content item is associated with at least one graphical overlay that is presented with the at least one content item.

20. The non-transitory computer-readable storage medium of claim 16, wherein a timeline associated with the life story is provided in the graphical user interface, and wherein the timeline facilitates access to content items included in the plurality of content items.

* * * * *